United States Patent Office 2,798,053
Patented July 2, 1957

2,798,053
CARBOXYLIC POLYMERS

Harold P. Brown, Akron, Ohio, assignor to The B. F. Goodrich Company, New York, N. Y., a corporation of New York No Drawing. Application September 3, 1952, Serial No. 307,711

15 Claims. (Cl. 260—2.2)

The present invention relates to the polymerization of carboxylic-type monomers and particularly to the production thereby of carboxylic polymers which are substantially insoluble in water and organic solvents.

It has been proposed heretofore to produce water-insoluble carboxyl-containing polymers by polymerizing a carboxylic monomer such as acrylic acid, maleic acid or anhydride, and the like in the presence of a cross-linking agent such as divinyl benzene; unsaturated diesters such as diallyl maleate or ethylene glycol dimethacrylate; diallyl or divinyl ethers and others such as are disclosed in U. S. Patents 2,340,110, 2,340,111 and 2,533,635. However, the polymerization of divinyl benzene with the carboxylic monomers is difficult to control so as to obtain reproducibly homogeneous and desirable polymers. The use of unsaturated diesters and diallyl or divinyl ethers as cross-linking agents is attended with little difficulty as regards control but produces polymers having the serious disadvantage of being readily hydrolyzed in water at high temperatures by the action of strong aqueous alkalis and acids such as are used as regenerating agents for the ion-exchange resins. Hydrolysis of the previously-insoluble polymer effects, through breaking of ester or ether cross-links, a great reduction in effective molecular weight and an increase in the swelling and solubility of the polymer in water. The diallyl ethers of dihydric alcohols do not effectively cross-link the carboxylic monomers, some of them functioning rather as chain transfer agents or modifying agents with the production of polymers low in molecular weight and soluble in water and many solvents.

I have discovered, however, that highly useful carboxylic polymers are obtained when a carboxylic monomer such as acrylic acid, maleic acid or anhydride, and the like is copolymerized with certain proportions of a polyalkenyl polyether of a polyhydric alcohol containing more than one alkenyl ether grouping per molecule, the parent polyhydric alcohol containing at least 4 carbon atoms and at least three hydroxyl groups. The resulting polymers are substantially insoluble in water and in most common organic solvents and are extremely resistant to hydrolytic degradation of the cross-links by strong alkali and acids and the like. Depending on the proportion of polyalkenyl polyether utilized, however, the polymers vary considerably in properties. With only 0.10 to 1.0% by weight of the polyether, insoluble gel-like polymers are obtained which per se, and especially in the form of their salts, have the ability to absorb large quantities of water with consequent many times increase in volume. Such polymers somewhat resemble, but are greatly superior to, gum tragacanth, gum Karaya and other naturally-occurring more or less insoluble gum-like substances conventionally used as bodying and suspending agents. The high swelling polymers of this invention are extremely useful in various mucilaginous or colloidal gel-like applications such as dentrifrices, surgical jellies, creams and ointments, and printing paste thickeners, and as bulk laxatives, carrying agents, ion-exchange resins and other materials for use in treatment of various disorders of the human and animal gastro-intestinal tract. The use of increased amounts of the polyether produces vary hard, insoluble and dimensionally-stable polymers having very high ion-exchange capacity.

In the production of the polymers of this invention I employ a monomeric mixture which contains two essential monomeric ingredients, each in certain proportions, one being a monomeric olefinically-unsaturated carboxylic acid such as acrylic acid, maleic acid or anhydride, sorbic acid and the like and the other being a polyalkenyl polyether of a polyhydric alcohol, which polyhydric alcohol contains at least 4 carbon atoms to which are attached at least 3 hydroxyl groups, the polyether containing more than one alkenyl ether group per molecule. Other monoolefinic monomeric materials may be present in the monomeric mixture if desired, even in predominant proportion, with the production of highly useful, water-insoluble carboxylic-type polymers useful for a great variety of applications ranging from gelatinous or mucilaginous dispersions to ion-exchange resins of high capacity.

The carboxylic monomers useful in the production of the polymers of this invention are the olefinically-unsaturated carboxylic acids containing at least one activated carbon-to-carbon olefinic double bond, and at least one carboxyl group, that is, an acid containing an olefinic double bond which readily functions in polymerization because of its presence in the monomer molecule either in the alpha-beta position with respect to a carboxyl group thusly

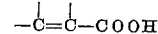

or as a part of a terminal methylene grouping thusly $CH_2=C<$. In the alpha-beta acids the close proximity of the strongly polar carboxyl group to the double-bonded carbon atoms has a strong activating influence rendering the substances containing this structure very readily polymerizable. Likewise, the presence of the terminal methylene grouping in a carboxylic monomer makes this type of compound much more easily polymerizable than if the double bond were intermediate in the carbon structure. Olefinically-unsaturated acids of this broad class includes such widely divergent materials as the acrylic acids such as acrylic acid itself, methacrylic acid, ethacrylic acid, alpha-chloro acrylic acid, alpha-cyano acrylic acid, and others, crotonic acid, beta-acryloxy propionic acid, hydrosorbic acid, sorbic acid, alpha-chloro sorbic acid, cinnamic acid, beta-styryl acrylic acid (1-carboxy-4-phenyl butadiene-1,3), hydromuconic acid, itaconic acid, citraconic acid, mesaconic acid, muconic acid, glutaconic acid, aconitic acid and others. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Anhydrides of the types formed by elimination of water from two or more molecules of the same or different unsaturated acids, such as acrylic anhydride, are not included because of the strong tendency of their polymers to hydrolyze in water and alkali.

It is ordinarily desirable to utilize, as the carboxylic monomer, one or more alpha-beta unsaturated carboxylic acids containing at least one carboxyl group, with the olefinic double bond alpha-beta to at least one carboxyl group. Illustrative alpha-beta unsaturated carboxylic acids of this nature include the acrylic acids disclosed above and in addition beta-methyl acrylic acid (crotonic acid), alpha-phenyl acrylic acid, and others, hydrosorbic acid, alpha-butyl crotonic acid, angelic acid, cinnamic acid, m-chloro cinnamic acid, p-chloro cinnamic acid, umbellic acid, and other monoolefinic monocarboxylic acids; maleic acid, fumaric acid, hydromuconic acid, glutaconic acid, itaconic acid, citraconic acid, mesaconic acid, tricarboxy ethylene, tetracarboxy ethylene, and other monoolefinic di- and polycarboxylic acids; sorbic acid, beta-acryloxy acrylic acid, beta styryl acrylic acid (4-phenyl 1-carboxy butadiene-1,3) and other polyolefinic monocarboxylic acids; 3-carboxy-pentadiene-(2,4)-oic-1, muconic acid, and other polyolefinic polycarboxylic acids; and maleic anhydride and other acid anhydrides having the general structure

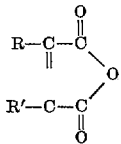

wherein R and R′ are selected from the group consisting of hydrogen, halogen, cyanogen (—C≡N), hydroxyl, lactam and lactone groups and alkyl, aryl, alkaryl, aralkyl, and cycloalkyl groups such as methyl, ethyl, propyl which can also be termed lower alkyl groups, octyl, decyl, phenyl, tolyl, xylyl, benzyl, cyclohexyl and the like; and others.

The preferred carboxylic monomers for use in this invention are the monoolefinic acrylic acids having the general structure

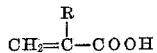

wherein R is a substituent selected from the class consisting of hydrogen, halogen, hydroxyl, lactone, lactam and the cyanogen (—C≡N) groups, monovalent alkyl radicals, monovalent aryl radicals, monovalent aralkyl radicals, monovalent alkaryl radicals and monovalent cycloaliphatic radicals. Illustrative acrylic acids of this preferred class are acrylic acid itself, methacrylic acid, ethacrylic acid, chloro-acrylic acid, bromo-acrylic acid, cyano-acrylic acid, alpha-phenyl acrylic acid, alpha-benzyl acrylic acid, alpha-cyclohexyl acrylic acid, and others. Alpha-halo acrylic acids readily hydrolyze at the halogen substitution with the formation of hydroxyl and lactone groups. Of this class, acrylic acid itself is most preferred because of its generally lower cost, ready availability, and ability to form superior polymers. Another particularly preferred carboxylic monomer is maleic anhydride.

The polyalkenyl polyethers useful in this invention contain more than one alkenyl ether grouping per molecule and those most useful possess alkenyl groups in which an olefinic double bond is present attached to a terminal methylene grouping thusly $CH_2=C<$. They are made by the etherification of a polyhydric alcohol containing at least 4 carbon atoms and at least 3 hydroxyl groups. Compounds of this class are readily produced, for example, by a Williamson-type synthesis, in which an alkenyl halide, or a mixture of such halides, such as allyl chloride, allyl bromide, methallyl chloride, methallyl bromide and others, is reacted with a strongy alkaline aqueous solution of one or more of the polyhydric alcohols. The product of such a synthesis usually is a complex mixture of polyethers containing varying numbers of ether groups on each molecule. Analysis of such materials, therefore, reveals only the average number of ether groupings on each molecule. These mixtures, however, if they analyze as containing an average number of ether groups per molecule greater than one, are capable of producing the insoluble carboxylic polymers of this invention. Since the efficiency of the polyether cross-linking agent increases with the number of potentially polymerizable groups on the molecule, it is much preferred to utilize polyethers containing an average of two or more alkenyl ether groupings per molecule. The polyvinyl polyethers of the polyhydric alcohols within the above broad class are produced by reacting acetylene with the polyhydric alcohol (or an alcoholate thereof) in a Reppe-type vinylation synthesis. The polycrotyl ethers of the polyhydric alcohols also are useful although they do not contain a terminal $CH_2=C<$ grouping.

Illustrative polyhydric alcohols of the above-described class that may be utilized in the preparation of the polyalkenyl polyether cross-linking agent include the butane triols such as 1, 2, 3-butane triol, 2,3,4-trihydroxy butyric acid, the aldotetroses such as erythrose and threose, keto-tetroses such as erythrulose; the aldopentoses such as arabinose, xylose, lyxose, and ribose; ketopentoses such as araboketose and xyloketose; aldohexoses such as glucose, galactose, mannose, gulose, idose, talose, allose and the like; ketohexoses such as fructose or levulose, sorbose and the like; other sugars including the mono-, di-, tri- and polysaccharides such as sucrose, maltose, lactose and raffinose; the hexosans, pentosans and hexosan-pentosans, the galactomannan and glucomannan gums, starch and others; reduced forms of the above and other sugars and polysaccharides such as the so-called "sugar alcohols" erythritol, xylitol, mono-, di- and tri-pentaerythritol, arabitol, mannitol, iditol, tolitol, sorbitol, inositol, dulcitol, and others; the oxidized derivatives of the sugars in which the oxidation has not been carried to the point where the original monosaccharide carbon chain unit is broken such as the mono- and di-carboxylic "sugar acids" including gluconic acid, glucuronic acid, galactonic acid, galacturonic acids, saccharic acid, mucic and pectic acids and other polyhydric alcohols of the class described.

A preferred class of polyhydric alcohols for use in the production of the polyalkenyl polyether monomer are known as the oligosaccharides, which are defined as containing from one to four monosaccharide units. In addition to the oligosaccharides themselves, their reduction products such as the alcohols, keto-alcohols and aldo-alcohols and their oxidation products which retain the original saccharide chain such as the sugar acids, the keto-acids, the aldo-acids and the like can be used. Illustrative saccharides of this class are the monosaccharides such as glucose, galactose, fructose, sorbose, rhamnose, and the like, disaccharides such as sucrose, arabinose, maltose, lactose, and the like, trisaccharides such as raffinose and others. Of these the disaccharide, sucrose, is much preferred because of its ready availability and its ability to produce polyethers of great reactivity with carboxylic monomers.

In the monomeric mixture the two essential monomeric materials should be present in certain proportions, although the exact proportions will vary considerably depending on the characteristics desired in the polymer. Two-component monomeric mixtures of the carboxylic monomer and the polyalkenyl polyether containing more than 50 to 70% by weight of polyalkenyl polyether do not polymerize readily with free-radical type catalysts and yields are generally low. On the other hand smaller amounts of the polyalkenyl polyether copolymerize quite readily with carboxylic monomers and the cross-linking effect of the polyalkenyl polyether on the carboxylic monomer is so strong that as little as 0.1% by weight thereof, based on the total mixture, produces a great reduction in the water- and solvent-solubility of the polymer. Polymers containing less than 5 to 10% by weight of the polyether. When 0.1 to 4.0%, more preferably 0.20 to 2.5%, by weight of the polyether is utilized water-insoluble polymers are obtained, especially with acrylic acids, which are extremely water-sensitive, especially in the form of their monovalent salts, and swell greatly with the absorption of hundreds of times their own weight of water. When 0.1 to 6.0%, more preferably 0.20 to 5% of the polyether is copolymerized with maleic anhydride high-swelling polymers also are obtained. Such low-level cross-linked polymers are greatly superior artificial gum-like materials suitable for use in mucilaginous compositions as replacements for the natural gums such as gum tragacanth, etc. Dimensionally stable low-swelling polymers are obtained from acrylic acids and maleic anhydride with as little as 5 to 10% by weight of the polyalkenyl polyether. Such low-swelling polymers are extremely high capacity ion exchange resins. For this purpose it is preferred to utilize not less than 5% and not more than 30% by weight of the polyalkenyl polyether, more preferably 10 to 20% by weight, although these preferred proportions will vary slightly according to the monomeric system. In a dual copolymer or two-component interpolymer, this means that the remainder of the monomeric mixture will be the carboxylic monomer. Other proportions may be utilized to produce polymers of various new and useful properties.

The monomeric proportions to be employed in the production of multi-component interpolymers may vary in a somewhat similar manner. However, since the swelling capacity (or swelling index) of the low-level cross-linked polymers, and also the ion-exchange capacity of the dimensionally-stable polymers, are both dependent on the carboxyl content of the polymer, it is generally desirable to utilize as much of the carboxylic monomer or monomers and as little of the other monomeric constituents as is consistent with the necessary water-insolubility and other desirable properties. In these interpolymers, therefore, the carboxylic monomer or monomers should never be less than 25%, and preferably not less than 40%, by weight of the total monomeric mixture. Multi-component interpolymers may be made from monomeric mixtures comprising from 25 to 95% of a carboxyilc monomer such as acrylic acid, 0.1 to 30% of a polyalkenyl polyether such as a polyallyl polyether of sucrose, and 5 to 74.9% of an additional monomer or monomers. Preferred for use as ion-exchange materials are tripolymers made from three-component mixtures consisting of from 40 to 80% by weight of acrylic acid, 10 to 20% of a polyallyl polyether such as that of sucrose, and 10 to 50% of an additional monomer such as styrene, methacrylamide, maleic anhydride, and the like. Preferred for use as water-swellable artificial gums are tripolymers resulting from the polymerization of monomeric mixtures containing, respectively, from 40 to 95% by weight of acrylic acid, 0.20 to 2.5% by weight of polyallyl polyether such as that of sucrose, and 4 to 59% of an additional monomer or monomers such as maleic anhydride, N-methyl acrylamide, methyl vinyl ether, ethyl vinyl ether, n-butyl vinyl ether and the like and mixtures of maleic anhydride, a vinyl alkyl ether such as vinyl methyl ether, and a polyallyl polyether, in which the sum of the moles of vinyl ether and polyallyl polyether is substantially equivalent to the molar quantity of maleic anhydride present. It is to be understood that in the above proportions, if a maximum amount of two of the monomers are utilized that somewhat less than maximum amounts of the other monomers must be utilized.

Suitable for use as additional monomers in the production of multi-component interpolymers, as above described, are monoolefinic monomers such as styrene, the chloro- and ethoxy-styrenes, etc., acrylamide, N-methyl acrylamide, N,N-dimethyl acrylamide, acrylonitrile, methacrylonitrile, methyl acrylate, ethyl acrylate, 2-ethylhexyl acrylate, methyl methacrylate, vinyl acetate, vinyl benzoate, vinyl pyridine, vinyl chloride, vinylidene chloride, vinylidene chlorobromide, vinyl carbazole, vinyl pyrrolidone, methyl vinyl ether, ethyl vinyl ether, n-butyl vinyl ether, methyl vinyl ketone, ethylene, isobutylene, dimethyl maleate, diethyl maleate, and many others. In addition to the above monoolefinic monomers, many of the divinyl, dialkenyl or other polyfunctional esters, amides, ethers, ketones, and the like may be utilized in the production of multi-component interpolymers, especially those polyfunctional monomers which nominally function as cross-linking or insolubilizing monomers but which are easily saponified and hydrolyzed to additional hydroxyl, carboxyl and other hydrophilic groups. For example, an interpolymer of acrylic acid and divinyl ether is insoluble in water but upon standing gradually goes into solution probably due to hydrolysis and breaking of divinyl ether cross-links. The presence of strong alkali or acid speeds the dissolution. Spectroscopic analysis confirms the presence in the polymer of non-carboxylic hydroxyls. Similarly, diesters such as diallyl maleate, ethylene glycol dimethacrylate, acrylic anhydride, beta-allyloxy acrylate and many others are readily saponified or hydrolyzed by alkali or acid with the introduction of additional hydroxyl and/or carboxyl groups. Of the above additional monomers styrene has been found highly suitable for use as hard, non-swelling ion-exchange resins while N-methyl acrylamide, methyl vinyl ether, ethyl vinyl ether and divinyl ether have been found useful for the production of the water-swellable, gum-like polymers.

The polymers of this invention are most preferably made by polymerization in an inert diluent having some solubilizing action on one or more of the monomeric ingredients but substantially none on the resultant polymer. Polymerization in mass may be employed but, however, is not preferred because of the difficulty in working up the solid polymeric masses obtained. Polymerization in an aqueous medium containing a water-soluble free radical catalyst peroxygen is useful, the product being obtained either as a granular precipitate or as a highly swollen gel, either of which may be used directly or are easily further sub-divided and dried. Polymerization in an organic liquid which is a solvent for the monomers but a non-solvent for the polymer, or in a mixture of such solvents, in the presence of a solvent-soluble catalyst is most preferred because the product is usually obtained as a very fine friable and often fluffy precipitate which, after solvent removal, seldom requires grinding or other further treatment before use. Suitable solvents for the latter method include benzene, xylene, tetralin, hexane, heptane, carbon tetrachloride, methyl chloride, ethyl chloride, bromo trichloro methane, and others, and mixtures of these and other solvents.

Polymerization in the diluent medium may be carried out in the presence of a free radical catalyst in a closed vessel in an inert atmosphere and under autogenous pressure or artificially-induced pressure or in an open vessel under reflux at atmospheric pressure. The temperature of the polymerization may be varied from 0° C. or lower to 100° C. or higher, more preferably from 20 to 90° C., depending to a large degree on the molecular weight desired in the polymer. Polymerization under reflux at 50 to 90° C. under atmospheric pressure using a free radical catalyst is generally effective in bringing a polymer yield of 75 to 100% in less than 10 hours, usually in less than 5 hours. Suitable free-radical catalysts include peroxygen compounds such as sodium, potassium and ammonium persulfates, caprylyl peroxide, benzoyl peroxide, hydrogen peroxide, pelargonyl peroxide, cumene hydroperoxides, tertiary butyl diperphthalate, tertiary butyl perbenzoate, sodium peracetate, sodium percarbonate, and the like as well as azo diisobutyryl nitrile, hereinafter referred to as azoisobutyronitrile, and others. Other catalysts utilizable are the so-called "redox" type of catalyst and the heavy-metal activated catalyst systems.

The polymers of this invention are useful as cation exchange resins in their as-obtained acid condition. When converted to an alkali metal, ammonum or amine-salt, the polymers are useful under certain conditions as anion exchange resins. Both the high-swelling and hard-infusible types are adaptable for these purposes. Regeneration of the cation- or anion-active forms of these resins is conventionally accomplished by extraction or boiling with aqueous solutions of strong mineral and organic acids or with alkali hydroxides, ammonium hydroxide or amine, as the case may be.

The high-swelling polymers are especially useful in soft, mucilaginous compositions for in vivo ion exchange in the control of edema conditions because of the fact that they have not only an inherently high ion-exhange capacity but their soft, often jelly-like consistency insures more efficient action in the gastro-intestinal tract than the ordinary granular or powdery forms of the insoluble, non-swelling ion exchange resins. Because of their great capacity and ability to hold water tenaciously under osmotic pull, these mucilaginous polymers and their salts also function ideally as bulk laxatives. These high-swelling polymers generally do not attain their maximum volume in water until converted to a partial alkali, ammonium or amine salt. As the percent neutralization is increased, the ratio of volume in distilled water to unit weight of polymer gradually increases to a maximum in the range 50 to 90% and then decreases as complete neutralization is approached. Neutralization to the extent of 75% produces a pH of about 7.0. The neutralizing agent is preferably a monovalent alkali such as sodium, potassium, lithium or ammonium hydroxide or the carbonates and bicarbonates thereof, or mixtures of the same, and also amine bases having not more than one primary or secondary amino group. Polyvalent bases such as calcium hydroxide, and in fact any polyvalent metal cation, have a strong deswelling action on the water-swollen polymers and their salts, although their absolute swell notwithstanding the presence of these polyvalent metal ions is higher than that of the naturally-occurring gum-like materials such as gum tragacanth and the like in the presence of the same deswelling agents. It is sometimes desirable, because of their effect on the viscosity and thixotropy of the water-swollen polymer gels, to neutralize the polymer with up to 25% of a polyvalent metal base such as calcium hydroxide and the like.

The invention will now be more fully described in the following specific examples, which are intended as being illustrative only, of the preparation of several types of polymers using various proportions of monomers, polymerization media, temperature, etc.

EXAMPLE 1

A polyether-type cross-linking agent is readily made by the allylation of sucrose. The sucrose is first dissolved in a concentrated aqueous caustic solution, one and one-half equivalent weights of allyl chloride for every hydroxyl group in the sucrose molecule added and the reaction autoclave sealed. The autoclave and its contents then are heated in a water bath at 80 to 83° C. for about 5 hours until no further drop in pressure occurs. The autoclave is cooled before opening and its contents then diluted with water until all precipitated salt is dissolved. An organic layer separates out and is isolated and steam distilled. The crude product resulting from steam distillation is then washed with a large volume of clear water. The wet polyallyl sucrose, or as referred to hereinafter, allyl sucrose, is then dissolved in toluene, decolorized with "Darco" activated charcoal and dried. The toluene is finally removed by distillation under reduced pressure at 100° C. The residue remaining is a polyallyl polyether of sucrose analyzing as having an average of 5.6 allyl groups and 1.97 hydroxyl (OH) groups per molecule (refractive index $N_D^{20}=1.920$). The yield is 91%. Other polyallyl polyethers of sucrose prepared by a similar synthesis contain an average of 5.00 to 6.08 allyl ether groups per molecule.

Samples of the above polyallyl polyethers of surcose are utilized in preparing copolymers with acrylic acid by a batch-charging technique using the following materials:

| Material: | Parts/wt. |
|---|---|
| Acrylic acid (anhydrous, 98% pure) | 86.8 |
| Allyl sucrose | 15.0 |
| Heptane | 1000 |
| Caprylyl peroxide | 0.5 |

The reactions are carried out in a sealed reactor at 75° C. The reaction is complete in each case in 1.25 to 20 hours with the formation of a fluid polymer slurry. The polymer is filtered and washed with additional heptane on a filter press and dried for 64 hours at 100° C. in a circulating air drier. The yield is about 98%. The polymers are very fine and uniform in particle size and require no grinding before use.

The outstanding properties of the polymers of this example are their extreme hardness and infusibility; insolubility and dimensional stability in water and most common solvents such as benzene, toluene, heptane, acetone, dioxane, and the like. The polymers are shaken with a known excess of an aqueous NaOH solution, about 4 hours being required to reach equilibrium. An aliquot portion of the free liquid remaining is then back titrated with standard acid to determine the cation capacity of the resin. The total cation capacity determined in this manner is 11.03 milli-equivalents of sodium per gram of polymer. By contrast the H-form of a commercial ion-exchange interpolymer known commercially as "Resodec" has a cation capacity by this method of 10.21 m. e./gram of sodium. The H-form of the acrylic acid/allyl sucrose copolymers of this example are easily regenerated by steeping in an aqueous hydrochloric acid or acetic acid solution. The cation capacity of the copolymers does not show an appreciable decrease after many cycles of alkalinization and acid regeneration. Polymers of even improved uniformity and other properties are produced by proportioning the allyl sucrose into the hexane medium during the reaction.

The polymers prepared as above from the allyl sucrose containing 5.6 allyl groups per molecule are also titrated to show behavior at incomplete neutralization as well as total capacity. The acrylic acid/allyl sucrose copolymer compares to the commercial cation exchange resin "Resodec" in both water and N/1 KCl solutions as follows:

| pH | Polymer Capacity (m. e. KOH/g.) | | | |
|---|---|---|---|---|
| | In H₂O | | In N/1 KCL | |
| | Resodec | AA/AS Copolymer | Resodec | AA/AS Copolymer |
| 4 | 0 | 0.6 | 0.7 | 2.4 |
| 5 | 0.1 | 1.7 | 2.2 | 4.5 |
| 6 | 0.6 | 3.4 | 4.6 | 7.1 |
| 7 | 1.3 | 6.4 | 7.5 | 9.4 |
| 8 | 6.5 | 10.2 | 9.4 | 10.8 |
| 9 | 10.5 | 12.0 | 10.8 | 12.0 |

It is readily seen that the acrylic acid/allyl sucrose copolymer not only has a higher total capacity but significantly higher capacity under pH conditions below 7.0. The lower level cross-linked acrylic acid allyl sucrose copolymers have higher cation exchange capacities, especially at a pH of 6 to 8, than the above dimensionally-stable copolymer and are useful for in vivo ion exchange such as in the treatment of edema.

EXAMPLE 2

A series of copolymers are prepared from acrylic acid and lesser amounts of allyl sucrose than utilized in the previous example. The reaction mixture has the following composition:

| Material: | Parts/wt. |
|---|---|
| Acrylic acid | Variable } total 100.0 |
| Allyl sucrose | Variable } |
| Potassium persulfate | 0.3 |
| Water | 2000 |

The amounts of allyl sucrose utilized are 0.4, 0.7, 1.0, 1.5 and 6.0% by weight on the total monomers. The reactions are carried out in each case at 50° C. in sealed reactors. The products obtained are somewhat tough, rubbery gels which are macerated in caustic to produce the 75% neutralized sodium salt. A portion of the 1.5% allyl sucrose copolymer is converted also to the mixed salt with 0.75 equivalent of caustic and 0.10 equivalent of calcium hydroxide. About 0.5 gram of each polymeric salt is added to 500 ml. of distilled water in a 500 ml.

graduate and allowed to stand for 24 hours. The absorbed water is measured by difference, after filtering off the gel in a funnel fitted with a glass wool plug. The swelling index is then calculated as the weight of swollen gel to that of the dry polymer salt. The swelling index of the 1.5% allyl sucrose copolymer is found by this method to be 600. The other copolymers of this series have lower swelling indices ranging from 140 to 450. These values compare very favorably with the swelling index of gum tragacanth, which is 164.

The 75% sodium salt and 75/10 sodium-calcium salts of 1.5% allyl sucrose copolymer of the above example are mixed with sufficient water to make mixtures containing 0.5, 1.0, 1.5 and 2% of the salt, allowed to swell overnight and then mixed in a mortar and pestle until smooth dispersions are obtained. A 2% mucilage is similarly prepared from top grade gum tragacanth. The viscosities of the resulting mucilages are then determined using the #4 spindle of the Brookfield viscometer operated at 6 R. P. M.

|   | Concentration, percent | Viscosity, Poises |
|---|---|---|
| Copolymer Sodium Salt | 0.5 | 306 |
|   | 1.0 | 450 |
|   | 1.5 | 792 |
|   | 2.0 | >1,000 |
| Sodium-Calcium Salt | 1 | 672 |
|   | 1.5 | 824 |
|   | 2.0 | >1,000 |
| Gum Tragacanth | 2 | 692 |

It is seen that both the sodium and sodium-calcium salts of the acrylic acid allyl sucrose copolymer form more viscous mucilages than tragacanth. For this reason, only one-half or less of the copolymer need be utilized to produce mucilaginous compositions of equivalent viscosity.

EXAMPLE 3

A series of water-insoluble, high swelling polymers are made with varying amounts of several different polyallyl polyethers prepared by procedures similar to that of Example 1. The monomeric materials are batch-charged according to the following proportions:

Material: Parts/wt.
- Acrylic acid _____ 98 to 99.0.  } total 100.
- Polyallyl ether _____ Variable 1 to 2.0.
- Potassium persulfate _ 0.10.
- Water _____ 1990.

The reaction in each case is carried out at 50° C. in a closed vessel. A yield of 80% or better is obtained in from 3 to 30 hours. In each case a voluminous but insoluble gel is obtained which can be extruded out of the reactor like grease. The polymer gels are easily macerated, dried and then reground in a hammermill to a fine powder, 100 mesh or finer. The polymer salts are compared below as to swelling index and in some cases, as to mucilage viscosity:

The above polyallyl ethers are also utilizable in larger amounts of 10 to 25% with the production of highly insoluble, acrylic acid copolymers which are very low swelling acrylic acid copolymers and have a cation capacity ranging from 11.0 to 12.0 me. of sodium/gram.

EXAMPLE 4

The previous examples have dealt with polymers made by batch-charging techniques. Copolymers of acrylic acid and allyl sucrose (6.08 allyl groups/molecule, $N_d^{20}=1.4895$) are prepared by refluxing in a 1/1 hexane/heptane mixture in the presence of 0.75 part/wt. per 100 parts of monomers of caprylyl peroxide, 10% of the allyl sucrose being charged with the acrylic acid while the remaining 90% is proportioned in a continuous manner over the course of the reaction. The allyl sucrose is added, in each case, over a period of 60 to 85 minutes followed by an additional period of reflux of about 15 minutes. The yield in all cases is in the range of 80 to 93% in 75 to 100 minutes total reflux time. The resultant fine polymer-solvent slurry is then diluted with additional solvent to facilitate filtering, the polymer being washed on the filter press with additional quantities of solvent. Upon oven drying fine, uniform and friable powders are obtained.

The polymers are compounded into plain aqueous mucilages and also into toothpastes according to the following recipe:

25 parts of $NaPO_3$ (insol.)
25 parts of $CaHPO_4 \cdot 2H_2O$
50 parts of 40% aqueous glycerol
2 parts of a sodium sulfate or sulfonate
1.5 parts of 75% sodium salt of polymer In the preparation of these mucilaginous compositions the polymer is first swollen in part of the water, or aqueous glycerol solution, the required amount of NaOH added as a solution in the remainder of the aqueous medium and the mixture then mixed or ground to insure homogeneity and good dispersion. The solid ingredients of the toothpaste formulation are then added and the mixture mixed as before. In all cases a smooth creamy composition results which is easily spread into a thin coherent film.

The cohesive power of the toothpaste is measured by pulling a small metal disk from a paste surface and measuring the force required. In this test a layer of paste about 3/8" thick is spread on a glass surface and an aluminum disk 1½ in. in diameter is embedded to about one-half the depth. The disk is attached with a hook to a sensitive spring scale of about 2 lbs. capacity. The scale is then pulled upwards at a slow constant rate of about 3—4 mm./sec. by means of a pulley and a geared-down motor. The scale reading when the disk breaks free from the paste is the cohesion value expressed in ounces. Most commercial toothpastes have a cohesion of about 6.0 oz. The mucilages and toothpastes are tested for suspension stability by centrifuging for 10 minutes in a small angle centrifuge operated at 3500 R. P. M.

| Polymer | Polyallyl Ether | Percent | Salt | Swelling Index Distilled Water | Mucilage Viscosity, poises | | | |
|---|---|---|---|---|---|---|---|---|
|  |  |  |  |  | 0.5% Concentration | 1.0% Concentration | 1.5% Concentration | 2.0% Concentration |
| H | Allyl Sorbitol (4.7 allyl groups). | 1.0 | 75% Na | 600 | 550 | 1,000 | 1,000 | >1,000 |
|  |  | 2.0 | 75% Na | 470 | 490 | 920 | 1,000 | >1,000 |
| I | Allyl penta-erythritol (2.78 allyl groups). | 2.0 | 75% Na | 435 |  |  |  |  |
| J | Allyl Raffinose (6.7 allyl groups). | 2.0 | 75% Na | 620 |  |  |  |  |
| K | Allyl Inositol (4.1 allyl groups). | 2.0 | 75% Na | 540 |  |  |  |  |
| L | Allyl Sorbitol (3.7 allyl groups). | 2.0 | 75% Na | 380 |  |  |  |  |
| Tragacanth |  |  |  |  | 6.0 | 32 | 208 | 500 |
| "Keltex" (Na-alginate) |  |  |  |  | 10 | 26 | 120 | 280 |

The suspension is classed as excellent when no separation of phases is observed, good when only a drop or two of clear serum is noted and fair when a noticeable clear layer separates out. The physical properties of the compositions are summarized as follows:

| Polymer | Parts Allyl sucrose | Mucilage Viscosity, poises | | | Toothpaste | |
|---|---|---|---|---|---|---|
| | | Conc. 0.5% | Conc. 1.0% | Conc. 1.5% | Cohesion at 1.5% conc. | Suspension |
| M | 1.0 (80% conv.) | 250 | 350 | 444 | 5.5–6.0 oz | Good. |
| N | 1.5 (82% conv.) | 240 | 760 | 1,000 | 8–9 oz | Excellent. |
| O | 1.5 (92% conv.) | 280 | 560 | 660 | 6 oz | Do. |
| P | 2.5 (80% conv.) | 60 | 390 | 1,000 | 7 oz. (at 1.25%) | Fair. |
| Commercial toothpaste (2% tragacanth). | | | | | 6 oz | Good. |

The significance of the above data is that proportioning the allyl sucrose produces a polymer which has both good cohesion and high suspending power. It also demonstrates that the acrylic acid allyl sucrose copolymers produce mucilages and toothpaste formulations which are equivalent or superior in most respects to those made with as much as 2–3% of gum tragacanth and that these properties are obtained with considerably less of the copolymer.

EXAMPLE 5

Copolymers of acrylic acid and allyl sucrose type monomers are desirably produced by solution polymerization in benzene. The reaction mixture employed is as follows:

Material: Parts/wt.
- Acrylic acid_____ Variable. } to total
- Polyallyl sucrose_____ 0.5 to 2.0%. } 100.
- Azoisobutyronitrile_____ 0.5 to 1.0.
- Benzene_____ 880.

The polymerization is carried out under autogenous pressure at 50° C. The product in each case is a fine friable powder of less than 325 mesh. The acid-form polymers are first freed of solvent, then swollen in water, converted to the 75% sodium salt and finally are ground to form smooth mucilages. The viscosity of the mucilags are as follows:

| 0.5 Allyl Sucrose | | 1.0% Allyl Sucrose | | 1.25% Allyl Sucrose | | 1.75% Allyl Sucrose | | 2.0% Allyl Sucrose | |
|---|---|---|---|---|---|---|---|---|---|
| Conc., percent | Viscosity, poises | Conc., percent | Viscosity, poises | Conc., percent | Viscosity, poises | Conc., percent | Viscosity, poises | Conc., percent | Viscosity, poises |
| 1.5 | 808 | 1.5 | 1,000 | 1.5 | 1,000 | 1.5 | 1,000 | 1.5 | 1,000 |
| 1.0 | 640 | 1.0 | 1,000 | 1.0 | 1,000 | 1.0 | 1,000 | 1.0 | 1,000 |
| 0.5 | 420 | 0.5 | 720 | 0.5 | 920 | 0.5 | 560 | 0.5 | 300 |

The acid-form polymers have a swelling index in distilled water varying from 53 to 224 while their partial sodium salts have swelling indices of up to 3 or 4 times as great.

Copolymers prepared by batch charging in benzene solution using increased amounts of allyl sucrose cross-linking agent are made to determine how low a ratio of allyl sucrose to acrylic acid should be employed to obtain high swelling polymers. The results are as follows:

Parts allyl sucrose: Swelling index
- 10 parts _____ 6.5
- 7 parts _____ 29
- 5 parts _____ 52
- 3 parts _____ >68

EXAMPLE 6

Tripolymers of acrylic acid, styrene and polyallyl sucrose containing 6.08 allyl groups/molecule are prepared by batch charging in hexane solution using materials in the following proportions:

| Material | Parts/Wt. | | |
|---|---|---|---|
| | A | B | C |
| Acrylic acid | 43.0 | 42.5 | 42 |
| Styrene | 56.0 | 55.5 | 54 |
| Allyl sucrose | 1.0 | 2.0 | 4.0 |
| Azoisobutyronitrile | 0.5 | 0.5 | 0.5 |
| Hexane | 500 cc. | 500 cc. | 500 cc. |

The polymerization is complete in about 20 hours at 50° C. The polymer is obtained as an extremely fine-grained solvent slurry which is diluted with additional hexane before filtration and washing on a plate and frame press. After oven drying a very voluminous, friable powder is obtained which is easily ball-milled to pass a 100 to 325 mesh screen or finer. When swollen in water and converted to the 75% sodium salt, these tripolymers exhibit swelling indices of 175, 130 and 75, respectively. A terpolymer made in a similar fashion from a mixture of 41.5% acrylic acid, 54.5% styrene and 3.8% allyl sucrose when converted to a 2% aqueous dispersion of its sodium salt has a viscosity of 80 poises. These data are quite surprising in view of the relatively large amounts of hydrophobic styrene present in the polymer.

EXAMPLE 7

The foregoing examples have been concerned with the use of a single acid, acrylic acid, as the carboxylic monomer. Mixtures containing in addition to acrylic acid a polymerizable dicarboxylic acid or anhydride have potentially higher carboxyl level (and therefore higher theoretical ion exchange capacity) than the foregoing interpolymers containing acrylic acid as the sole carboxylic monomer. Mixtures of acrylic acid, maleic anhydride and the polyallyl polyether of sucrose containing about 6.08 allyl ether groups per molecule are polymerized in 880 parts of benzene per 100 of monomer at 50° C. The data are as follows:

drolysis. Infra-red analysis of the polymer confirms the presence of non-carboxylic hydroxyls.

| Polymer | Catalyst | Charge, Percent/Wt. | | | Temperature, °C. | Percent Conversion | Swelling Index [1] | Capacity Me-Na per gram |
|---|---|---|---|---|---|---|---|---|
| | | Acrylic Acid | Maleic Anhydride | Allyl Sucrose | | | | |
| 1 | Benzoyl peroxide | 41.0 | 59.0 | none | 50 | 74 | Soluble | |
| 2 | do | 42.4 | 57.6 | none | 50 | 59 | do | |
| 3 | do | 40.5 | 55.0 | 4.5 | 80 | 62 | 34 | 13.72 |
| 4 | do | 41.2 | 54.5 | 4.5 | 50 | 62 | 27.3 | 14.05 |
| 5 | Azoisobutyronitrile | 30.0 | 70.0 | none | 50 | 76 | Soluble | |
| 6 | do | 47.6 | 47.6 | 4.8 | 50 | 68 | 26.0 | 13.92 |
| 7 | do | 46.75 | 46.75 | 6.5 | 50 | 72 | 12.0 | 13.85 |

[1] Swelling index in artificial intestinal juice having the composition of $NaHCO_3$—1.50%, bile salts—1.0%, pancreatin—0.28%, and the remainder distilled water.

EXAMPLE 8

Interpolymers may be prepared from acrylic acid and other monomers which introduce hydrophilic groups other than carboxyls, or whose polymers after chemical treatment will contain such other groups. For example, when acrylic acid is cross-linked with divinyl ether a gel-like insoluble polymer is formed which, however, gradually goes into solution in water upon standing and gives evidences of containing alcoholic hydroxyl groups in addition to carboxylic hydroxyls. This phenomenon is believed due to hydrolysis or breaking of divinyl ether cross-links with the formation of hydroxyl groups. The presence of alcoholic hydroxyls is noted in insoluble tripolymers of maleic anhydride or acrylic acid, divinyl ether and allyl sucrose but these tripolymers remain highly insoluble in water due to the stability of the polyallyl sucrose cross-links. These hydrolyzed, insoluble tripolymers containing 0.5 to 1.0% allyl sucrose form especially desirable viscous mucilages. When these tripolymers contain as much as 10% of allyl sucrose so as to be non-swelling they are exceedingly efficient ion-exchange resins.

A series of tripolymers are made using the following reaction mixtures:

| Material | Parts/Wt. | | | | |
|---|---|---|---|---|---|
| | I | II | III | IV | V |
| Acrylic acid | 67.3 | 80.5 | 67.3 | | |
| Maleic anhydride | | | | 73.3 | 74.0 |
| Divinyl Ether | 32.7 | 19.5 | 32.7 | 25.7 | 26.0 |
| Allyl sucrose | 1.0 | 1.0 | 0.5 | 1.0 | |
| Benzoyl peroxide | 1.0 | 1.0 | 1.0 | 1.0 | 1.0 |
| Benzene | 880.0 | 880.0 | 880.0 | 880.0 | 880.0 |

The reactions are carried out at 50° C. under autogenous pressure. The yield varies from 86% for polymer No. III to 96.5% for polymer No. II. The polymer slurry in each case is filtered, the filter cake washed with benzene and then dried. When placed in water overnight polymer No. V goes completely into solution, all others remaining completely insoluble. Polymers Nos. I to IV however, are hydrolyzed in water but remain insoluble. The presence of small amounts of sodium or ammonium hydroxides or a strong acid such as HCl speeds the hydrolysis.

The viscosity of mucilages prepared from the 75% sodium salts of polymers I to IV, above, is as follows:

| Polymer No. Mucilage Concentration | I | II | III | IV |
|---|---|---|---|---|
| | Poises | Poises | Poises | Poises |
| 1.5% | >1,000 | >1,000 | >1,000 | 964 |
| 1.0% | >1,000 | >1,000 | >1,000 | 588 |
| 0.5% | 60 | 900 | 240 | 216 |

A toothpaste formulation made from polymer No. IV according to the procedure described in Example 4 is possessed of an initial cohesion value of 6 ounces (same as commercial tragacanth based toothpastes) and possesses such excellent suspension stability that no separation is observed after centrifuging for 30 minutes at 2400 R. P. M.

In Examples 7 and 8 it is readily apparent that maleic anhydride tends to produce an alternating interpolymer so that in order to obtain high yields it is necessary (to obtain a high-swelling polymer or high-capacity ion exchange resin) to utilize a substantial proportion of a 3rd monomer in order to insure complete reaction of the maleic anhydride. Divinyl ether appears to be an excellent monomer because each molecule thereof reacts with two molecules of maleic anhydride to produce, when hydrolyzed, a highly hydrophilic but insoluble polymer.

EXAMPLE 9

Tripolymers of acrylic acid, vinyl acetate, and allyl sucrose are made using the following materials:

| Material | Parts/Wt. | | |
|---|---|---|---|
| | I | II | III |
| Acrylic acid | 25.0 | 50.0 | 75.0 |
| Vinyl acetate | 75.0 | 50.0 | 25.0 |
| Allyl sucrose | 1.5 | 1.5 | 1.5 |
| Azoisobutyronitrile | 0.75 | 0.75 | 0.75 |
| Benzene | 500.0 | 500.0 | 500.0 |

The polymerization takes place in each case in 4 to 20 hours at 50° C. with the production of a fine polymer slurry. When swollen in water and converted to the 75% sodium salt, extremely viscous mucilages are formed. The polymer salts are then tested for suspension stability in an aqueous emulsion of mineral oil. Centrifuging of these oil emulsions indicates that tripolymers of acrylic acid, vinyl acetate and polyallyl sucrose containing 10 to 25% vinyl acetate have good suspending power for oils and the like in auto polishes, cleaning compositions and the like.

EXAMPLE 10

Still other tripolymers of acrylic acid and allyl sucrose are made using vinyl n-butyl ether, vinyl ethyl ether and N-methyl acrylamide as the third monomers. The following proportions of materials are used:

| Material | Parts/Wt. | | | | | | | | | | |
|---|---|---|---|---|---|---|---|---|---|---|---|
| | I | II | III | IV | V | VI | VII | VIII | IX | X | XI |
| Acrylic acid | 90 | 70 | 50 | 30 | 10 | 90 | 80 | 60 | 90 | 75 | 50 |
| N-methyl acrylamide | 10 | 30 | 50 | 70 | 90 | | | | | | |
| Vinyl n-butyl ether | | | | | | 10 | 20 | 40 | | | |
| Vinyl ethyl ether | | | | | | | | | 10 | 25 | 50 |
| Allyl sucrose | 1.0 | 1.0 | 1.0 | 1.0 | 1.0 | 1.0 | 1.0 | 1.0 | 1.0 | 1.0 | 1.0 |
| Benzoyl peroxide | 1.0 | 1.0 | 1.0 | 1.0 | 1.0 | 1.0 | 1.0 | 1.0 | 1.0 | 1.0 | 1.0 |
| Benzene | 880 | 880 | 880 | 880 | 880 | 880 | 880 | 880 | 880 | 880 | 880 |
| Conversion, percent | 98 | 100 | 100 | 100 | 100 | 90 | 80 | 64 | | 76 | 98 |

The reactions are carried out in each case at 50° C. with batch charging technique. The polymers are isolated and dried, allowed to swell in water and converted to the 75% sodium salts and then into aqueous mucilages. The viscosity behavior of these mucilages, with various concentrations of polymer salt are as follows:

| Polymer Conc. | Viscosity, poises | | | | | | | | | | |
|---|---|---|---|---|---|---|---|---|---|---|---|
| | I | II | III | IV | V | VI | VII | VIII | IX | X | XI |
| 1.5% | >1,000 | >1,000 | >1,000 | 580 | 640 | 900 | 528 | 80 | 360 | 500 | 900 |
| 1.0% | >1,000 | >1,000 | >1,000 | 440 | 500 | 840 | 480 | 44 | 300 | 444 | 840 |
| 0.5% | 820 | 820 | 780 | 400 | 340 | 760 | 400 | 24 | 200 | 328 | 760 |

As the ratio of acrylic acid to N-methyl acrylamide is reduced to 1:1 there is very little effect on the viscosity characteristics but below this ratio the viscosity drops suddenly and appears to level off. With the vinyl ethers the viscosity drops smoothly with increasing proportions of ether.

The surprising feature about the tripolymers of Example 10, however, is the strong hydrophilic effect of the non-carboxylic hydroxyls and amide groups. The hydrophilic power of the amide group, however, depends to some extent on the structure of the amide monomer. Tripolymers containing methacrylamide, which has exactly the same molecular weight as N-methyl acrylamide, are not quite as satisfactory in mucilaginous applications. For example, a series of methacrylamide tripolymers crosslinked with the same amount (1%) of polyallyl sucrose as those of Example 10, are converted to mucilages of the 75% sodium salt and found to have the following properties:

| Percent Methacrylamide | 20 | 40 | 60 | 80 |
|---|---|---|---|---|
| Mucilage Concentration: | Percent Poises | Poises | Poises | Poises |
| 1.5% | >1,000 | 380 | 60 | too low to measure. |
| 1.0% | >1,000 | 320 | 24 | |
| 0.5% | >1,000 | 160 | too low | |

EXAMPLE 11

The mono-vinyl alkyl ethers also produce insoluble, hydrolyzed polymers with maleic anhydride as the carboxylic monomer and allyl sucrose (6.08 allyl groups/molecule) as the cross-linking monomer. The polymerizations, in each case, are carried out at 50° C. in 880 parts of benzene/100 parts of monomers using 2 parts/wt. benzoyl peroxide catalyst. The monomeric mixtures so polymerized are as follows:

| Monomers | Parts/Wt. | | |
|---|---|---|---|
| | I | II | III |
| Maleic Anhydride | 50 | 60 | 62.8 |
| Vinyl n-butyl ether | 50 | | |
| Vinyl ethyl ether | | 40 | |
| Vinyl methyl ether | | | 37.2 |
| Allyl sucrose (6.08 groups) | (Varied 0.5, 1.0, 1.5 and 2.0 with each mixture indicated) | | |

The friable dry polymers obtained form viscous mucilages in aqueous alkali, the type III tripolymer made with 1.0 part of allyl sucrose having the following viscosity characteristics:

| Polymer Conc., Percent | Viscosity, poises |
| --- | --- |
| 1.5 | 360 |
| 1.0 | 332 |
| 0.5 | 260 |
| 0.25 | 96 |

EXAMPLE 12

A copolymer is made in which one chemical equivalent weight of maleic anhydride is supplied for each allyl ether group on the allyl sucrose molecule. An allyl sucrose containing an average of 5.0 allyl ether groups per molecule is utilized, with the polymerization being conducted at 50° C. in 880 parts/100 of monomers of benzene and 1.0 part of azoisobutyronitrile catalyst. The polymer is completely insoluble in water and solvents and is useful as an ion-exchange resin.

While there have been disclosed with considerable detail certain preferred manners of practicing this invention, it is not intended or desired to be solely limited thereto, for as hitherto stated the procedure may be modified, the precise proportions of the materials utilized may be varied, and other materials having equivalent properties may be employed, if desired, without departing from the spirit and scope of the invention as defined in the appended claims.

I claim:

1. An interpolymer of a monomeric mixture consisting of from 97.5 to 99.8% by weight of acrylic acid and from about 2.5 to 0.2% by weight of a monomeric polyether of sucrose in which the hydroxyls which are modified are etherified with allyl groups, said polyether containing at least two allyl groups per sucrose molecule.

2. An interpolymer of a monomeric monoolefinic acrylic acid of the structure

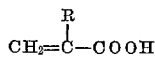

where R is a substituent selected from the class consisting of hydrogen and lower alkyl groups, and from about 0.1 to about 10% by weight based on the total monomers of a monomeric polyether of an oligosaccharide in which the hydroxyl groups which are modified are etherified with allyl groups said polyether containing at least two allyl ether groups per oligosaccharide molecule.

3. An interpolymer of a monomeric monoolefinic acrylic acid of the structure

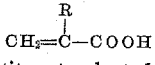

wherein R is a substituent selected from the class consisting of hydrogen and lower alkyl groups, and from 0.1 to 4.0% by weight based on the total monomers of a monomeric polyether of an oligosaccharide in which the hydroxyl groups which are modified are etherified with allyl groups said polyether containing at least two allyl ether groups per oligosaccharide molecule.

4. An interpolymer of a monomeric monoolefinic acrylic acid of the structure

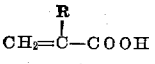

wherein R is a substituent selected from the class consisting of hydrogen and lower alkyl groups, and from 5 to 10% by weight based on the total monomers of a monomeric polyether of an oligosaccharide in which the hydroxyl groups which are modified are etherified with allyl groups, said polyether containing at least two allyl ether groups per oligosaccharide molecule.

5. An interpolymer of from 90 to 99.9% of monomeric acrylic acid and from about 0.1 to 10% by weight of a monomeric polyether of sucrose in which the hydroxyls which are modified are etherified with allyl groups, said polyether containing at least two allyl groups per sucrose molecule.

6. An interpolymer of a monomeric mixture comprising from 25 to 95% by weight of monomeric acrylic acid, from 0.1 to 10% by weight of a polyether of an oligosaccharide in which the hydroxyls which are modified are etherified with allyl groups, said polyether containing at least two allyl groups per oligosaccharide molecule and 5 to about 57% by weight of another monoolefinic monomer which is copolymerizable with acrylic acid.

7. An interpolymer of monomeric maleic anhydride, a monomeric vinyl lower alkyl ether and from about 0.1 to about 10% by weight of the total monomers of a monomeric polyether of an oligosaccharide in which the hydroxyl groups which are modified are etherified with allyl groups, said polyether having at least two allyl groups per oligosaccharide molecule, the sum of the moles of vinyl alkyl ether and polyallyl polyether being substantially equivalent to the molar quantity of maleic anhydride present.

8. A copolymer of a monomeric mixture consisting of acrylic acid and about 10% by weight on the total monomers of a polyether of sucrose in which the hydroxyl groups which are modified are etherified with allyl groups, said polyether containing at least two allyl groups per sucrose molecule.

9. A tripolymer of a monomeric mixture consisting of from 30 to 90% by weight of acrylic acid, from 0.20 to 2.5% by weight of a polyether of sucrose in which the hydroxyl groups which are modified are etherified with allyl groups, said polyether containing at least two allyl groups per sucrose molecule, and the remainder being N-methyl acrylamide.

10. A tripolymer of a monomeric mixture consisting of 41.5 to 43% by weight of acrylic acid, from 0.2 to 2.5% by weight of a polyether of sucrose in which the hydroxyl groups which are modified are etherified with allyl groups, said polyether containing at least two allyl groups per sucrose molecule, and the remainder being styrene.

11. A tripolymer of a monomeric mixture consisting of maleic anhydride, methyl vinyl ether, and from about 0.1 to about 10% by weight of the other monomers of a monomeric polyether of sucrose in which the hydroxyl groups which are modified are etherified with allyl groups, said polyether containing at least two allyl groups per sucrose molecule, the sum of the moles of vinyl methyl ether and polyallyl polyether being substantially equivalent to the molar quantity of maleic anhydride present.

12. A composition comprising a cross-linked interpolymer of a monomeric mixture, said mixture comprising as essential ingredients (1) at least 40% by weight of a monomeric, polymerizable alpha-beta, monoolefinically-unsaturated lower aliphatic carboxylic acid, from 0 to 60% by weight of a different olefinically unsaturated monomer copolymerizable with said alpha-beta unsaturated acid, and (2) from about 0.1 to about 10% by weight of the other monomers of a polyether of a polyol selected from the class consisting of oligosaccharides, reduced derivatives thereof in which the carbonyl group is converted to an alcohol group and pentaerythritol, the hydroxyl groups of said polyol which are modified being etherified with allyl groups, said polyol having at least two allyl groups per polyol molecule, said interpolymer being substantially insoluble in liquid, volatile organic hydrocarbons and dimensionally stable on exposure to air.

13. A composition comprising a cross-linked interpolymer of a monomeric mixture comprising a monomeric, polymerizable, alpha-beta monoolefinically unsaturated lower aliphatic carboxylic acid and from about 0.1 to about 10% by weight of the total monomers of a polyether of a polyol selected from the class consisting of oligo-saccharides, reduced derivatives thereof in which the carbonyl group is converted to an alcohol group and pentaerythritol, the hydroxyl groups of said polyol which are modified being etherified with allyl groups, said polyol having at least two allyl ether groups per polyol molecule, said interpolymer being substantially insoluble in liquid, volatile organic hydrocarbons and dimensionally stable on exposure to air.

14. A cross-linked interpolymer of a monomeric mixture of substantially equimolar proportions of maleic anhydride and methyl vinyl ether and from about 0.1 to about 10% by weight based on the said monomeric mixture of a polyether of pentaerythritol in which the hydroxyl groups which are modified are etherified with allyl groups, said polyether containing at least two allyl groups per pentaerythritol molecule.

15. A cross-linked interpolymer of monomeric acrylic acid and from about 0.1 to about 10% by weight of said acid of a polyether of pentaerythritol in which the hydroxyl groups which are modified are etherified with allyl groups, said ether having at least two allyl groups on the pentaerythritol molecule.

References Cited in the file of this patent

UNITED STATES PATENTS

| | | |
|---|---|---|
| 2,336,985 | Freund | Dec. 14, 1943 |
| 2,409,633 | Kropa | Oct. 22, 1946 |
| 2,541,142 | Zief et al. | Feb. 13, 1951 |
| 2,562,537 | Roach | July 31, 1951 |
| 2,606,881 | Zief et al. | Aug. 12, 1952 |
| 2,623,864 | Wrigley et al. | Dec. 30, 1952 |

UNITED STATES PATENT OFFICE
CERTIFICATE OF CORRECTION

Patent No. 2,798,053                                         July 2, 1957

Harold P. Brown

It is hereby certified that error appears in the printed specification of the above numbered patent requiring correction and that the said Letters Patent should read as corrected below.

Column 1, line 72, for "vary" read -- very --; column 4, lines 60 and 61, for "Polymers containing less than 5 to 10% by weight of the polyether." read -- Polymers containing less than 5 to 10% by weight of water extractable material are produced with as little as 0.2 to 0.5% by weight of the polyether. --; column 11, line 47, for "mucilags" read -- mucilages --; column 17, line 42, claim 2, for "where" read --wherein--.

Signed and sealed this 3rd day of December 1957.

(SEAL)
Attest:

KARL H. AXLINE                                                            ROBERT C. WATSON
Attesting Officer                                          Commissioner of Patents